United States Patent
Jakobsen

(10) Patent No.: US 11,219,860 B1
(45) Date of Patent: Jan. 11, 2022

(54) $CO_2$ CAPTURE PROCESS WITH ELECTROLYTIC REGENERATION

(71) Applicant: ESTECH A/S, Svendborg (DK)

(72) Inventor: Jan Stougaard Jakobsen, Svendborg (DK)

(73) Assignee: ESTECH A/S, Svendborg (DK)

( * ) Notice: Subject to any disclaimer, the term of this patent is extended or adjusted under 35 U.S.C. 154(b) by 0 days.

(21) Appl. No.: 17/331,040

(22) Filed: May 26, 2021

(30) Foreign Application Priority Data

Nov. 6, 2020 (EP) ..................... 20206242

(51) Int. Cl.
*B01D 53/14* (2006.01)
*B01D 53/96* (2006.01)
(Continued)

(52) U.S. Cl.
CPC .......... *B01D 53/965* (2013.01); *B01D 53/62* (2013.01); *B01D 53/78* (2013.01); *C02F 1/441* (2013.01);
(Continued)

(58) Field of Classification Search
CPC ...... B01D 53/965; B01D 53/62; B01D 53/78; B01D 2251/306; B01D 2251/604;
(Continued)

(56) References Cited

U.S. PATENT DOCUMENTS

| | | |
|---|---|---|
| 3,519,488 A | 7/1970 | Giner |
| 4,197,421 A | 4/1980 | Steinberg |

(Continued)

FOREIGN PATENT DOCUMENTS

| | | |
|---|---|---|
| CN | 206799327 | 12/2017 |
| EP | 2737937 | 6/2014 |

(Continued)

OTHER PUBLICATIONS

Extended Search Report EP20206242.8, dated May 25, 2021, 10 pages.

*Primary Examiner* — Cabrena Holecek
(74) *Attorney, Agent, or Firm* — Nixon & Vanderhye P.C.

(57) ABSTRACT

A method of scrubbing a gas, such as flue gas or exhaust gas, comprising carbon dioxide to deplete the gas of carbon dioxide ($CO_2$), the method comprising the steps of:
  scrubbing the gas in a scrubber (210) with a first alkaline, aqueous scrubbing liquid to dissolve carbon dioxide ($CO_2$) as hydrogen carbonate ($HCO_3^-$) and/or as carbonate ($CO_3^{2-}$) in the first alkaline, aqueous scrubbing liquid, thereby providing a first spent aqueous scrubbing liquid comprising hydrogen carbonate ($HCO_3^-$) and/or carbonate ($CO_3^{2-}$), the first spent aqueous scrubbing liquid having a pH from about 7 to about 9;
  feeding the first spent aqueous scrubbing liquid to an anode chamber of an electrolytic cell (310) comprising the anode chamber (313) and a cathode chamber (312) separated by a membrane (311);
  regenerating the first spent aqueous scrubbing liquid in the electrolytic cell (310) by electrolysis, the electrolysis increasing the pH of the first spent aqueous scrubbing liquid in the cathode chamber (312), the electrolysis further depleting the first spent aqueous scrubbing liquid of hydrogen carbonate ($HCO_3^-$) and of carbonate ($CO_3^{2-}$) in the anode chamber (313) by decreasing the pH, the regeneration further comprising generating gaseous hydrogen in the cathode chamber (312) and a gaseous mixture of oxygen and carbon dioxide ($CO_2$) in the anode chamber (313) by electrolysis; and
  withdrawing regenerated alkaline, aqueous scrubbing liquid from the cathode chamber (312) and re-circulating it to the scrubber (210);

(Continued)

wherein:

the gaseous hydrogen is withdrawn from the cathode chamber (312); and the gaseous mixture of oxygen and carbon dioxide is withdrawn from the anode chamber (313).

28 Claims, 7 Drawing Sheets

(51) Int. Cl.
*H01M 8/0656* (2016.01)
*B01D 53/78* (2006.01)
*B01D 53/62* (2006.01)
*C02F 1/44* (2006.01)
*C02F 1/461* (2006.01)
*C02F 1/467* (2006.01)
*C02F 103/18* (2006.01)
*C02F 101/10* (2006.01)

(52) U.S. Cl.
CPC .......... *C02F 1/467* (2013.01); *C02F 1/46104* (2013.01); *H01M 8/0656* (2013.01); *B01D 2251/306* (2013.01); *B01D 2251/604* (2013.01); *B01D 2257/504* (2013.01); *C02F 2101/10* (2013.01); *C02F 2103/18* (2013.01); *C02F 2301/046* (2013.01)

(58) Field of Classification Search
CPC ............... B01D 2257/504; C02F 1/441; C02F 1/46104; C02F 1/467; C02F 2101/10; C02F 103/18; C02F 2301/046; H01M 8/0656

See application file for complete search history.

(56) References Cited

U.S. PATENT DOCUMENTS

| 2015/0246314 | A1* | 9/2015 | Constantz | B01D 53/62 |
| | | | | 423/220 |
| 2017/0107478 | A1* | 4/2017 | Harmon | F23J 15/02 |
| 2019/0240621 | A1* | 8/2019 | Torres | B01D 53/62 |

FOREIGN PATENT DOCUMENTS

| EP | 3 524 337 | 8/2019 |
| JP | 2008-100211 | 5/2008 |

\* cited by examiner

$CO_2$ CAPTURE PROCESS WITH ELECTROLYTIC REGENERATION

This application claims priority to EP Patent Application No. 20206242.8 filed 6 Nov. 2020, the entire contents of which is hereby incorporated by reference.

TECHNICAL FIELD

The present invention relates to a method of scrubbing a gas, such as flue gas comprising carbon dioxide ($CO_2$), to deplete the gas of carbon dioxide, comprising regenerating spent aqueous scrubbing liquid. Further, the present invention relates to a system for such scrubbing of a gas, such as flue gas, comprising carbon dioxide.

BACKGROUND

Carbon dioxide ($CO_2$) is a gas that when emitted into the atmosphere is damaging to the climate as it contributes to the green-house effect and rise in global temperature. It is for example produced as a byproduct when fossil fuel, e.g. coal, gasoline or diesel, is burned. Coal- and gas-fired power plants accounts for a large share of $CO_2$ emissions. It is a goal for many sectors to lower carbon dioxide emissions.

Emitted gases resulting from combustion and comprising $CO_2$ are typically denoted flue gases or exhaust gases. Depleting such emitted gases of $CO_2$ by lowering the $CO_2$ content in the emitted gases, can be done by so called scrubbing of the gases, i.e. removing the $CO_2$ from the gas stream by absorbing/dissolving $CO_2$ in a liquid. The primary application for $CO_2$ scrubbing is for removal of $CO_2$ from the exhaust (i.e. flue gas) of coal- and gas-fired power plants, downstream of a power station, before the gas is released into the atmosphere. By using such a process, it would be possible to significantly lower the $CO_2$ emissions involved in coal-fired power generation. In the chemical industry, $CO_2$ scrubbing is used to separate $CO_2$ from natural gas, for use in, for example, the beverage or fertilizer sector.

In a $CO_2$-scrubbing system, a scrubbing solution takes up the carbon dioxide from the flue gas, at low temperatures, in an absorber. Most common is scrubbing of the flue gas using a chemical absorption medium, such as an alkaline, aqueous liquid. In an alkaline, aqueous liquid, $CO_2$ will dissolve and partly be hydrolyzed into carbonic acid ($H_2CO_3$). Given the alkaline pH, formed carbonic acid ($H_2CO_3$) will be shifted into hydrogen carbonate ($HCO_3^-$) and/or carbonate ($CO_3^{2-}$), as outlined below.

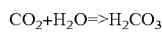

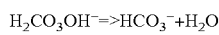

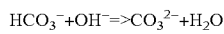

The technology being primarily developed for this process involves the use of aqueous amines, e.g. aqueous monoethanolamine, as absorption solvent. Amine scrubbing has been used to separate carbon dioxide ($CO_2$) from natural gas and hydrogen since 1930. However, it is not yet used on a larger scale for $CO_2$ capture from coal-fired power plants. The process is energy consuming and the technology has not been implemented in large scale because of the capital costs of installing the facility and the operating costs. Scrubbers using aqueous monoethanolamine as absorption solvent for example use large amounts of heat for regeneration of the solvent used in the scrubber. Presently, there are no other industrial applicable technologies that will provide energy-efficient or timely solutions to $CO_2$ emission from conventional coal-fired power plants.

Further key areas in development work on the carbon capture process include process integration and optimization for applications in large-scale power plants.

There is an imperative need for improved scrubbing systems that preferably require less heat for CO2 capture.

SUMMARY

Accordingly, there is, according to a first aspect, provided a method of scrubbing a gas comprising carbon dioxide ($CO_2$) to deplete the gas of carbon dioxide. The gas comprising carbon dioxide ($CO_2$) may typically be a result from combustion, such as flue gas or exhaust gas. However, also other gases comprising carbon dioxide ($CO_2$) may be scrubbed by the present method. An example would be to capture $CO_2$ from a power plant that generates heat and power from biomass.

The method comprises the steps of scrubbing the gas in a scrubber with a first alkaline, aqueous scrubbing liquid to dissolve carbon dioxide ($CO_2$) as hydrogen carbonate ($HCO_3^-$) and/or as carbonate ($CO_3^{2-}$) in the first alkaline, aqueous scrubbing liquid, thereby providing a first spent aqueous scrubbing liquid comprising hydrogen carbonate ($HCO_3^-$) and/or carbonate ($CO_3^{2-}$). The first spent aqueous scrubbing liquid has a pH from about 7 to about 9, in order to optimize the subsequent regeneration.

The method further comprises the step of feeding the first spent aqueous scrubbing liquid to an anode chamber of an electrolytic cell with an anode and a cathode. The anode and the cathode of the electrolytic cell are separated by a membrane to provide the anode chamber and a cathode chamber. The membrane is permeable to alkali metals, such as lithium, sodium and potassium, but has no or low permeability to hydrogen carbonate ($HCO_3^-$) and/or to carbonate ($CO_3^2$). Typically, the membrane is permeable only to cations. The membrane may be a cation-exchange membrane. In the electrolytic cell, the first spent aqueous scrubbing liquid is regenerated by electrolysis. In regenerating the spent aqueous scrubbing liquid, a number of electrolytic cells connected in parallel may be used. Before being fed to the anode chamber, the spent aqueous scrubbing liquid may be filtered to remove particulate matter.

In electrolysis, water is converted into oxygen and hydronium ions ($H_3O^+$) at the anode, whereas water is converted into hydrogen and hydroxide ions ($OH^-$) at the cathode. The electrolysis thus increases the pH of the first spent aqueous scrubbing liquid in the cathode chamber and depletes the first spent aqueous scrubbing liquid of hydrogen carbonate ($HCO_3^-$) and of carbonate ($CO_3^{2-}$) in the anode chamber, by decreasing the pH to shift the equilibrium towards carbonic acid in turn shifted into carbon dioxide. The regeneration further comprises generating gaseous hydrogen in the cathode chamber and a gaseous mixture of oxygen and carbon dioxide in the anode chamber by electrolysis. The chemical reactions and description of the operation of the processes are further described in the Detailed Description herein further below.

The method further comprises the step of withdrawing regenerated alkaline, aqueous scrubbing liquid from the cathode chamber and re-circulating it to the scrubber.

One key difference from the set-up of commercially available amine scrubbers is that the scrubbing liquid in the present method is regenerated by electrochemistry, while scrubbers in the art typically use large amounts of heat for regeneration of the scrubbing liquid used in the scrubber.

According to the present method, in regenerating the scrubbing liquid its pH is increased. Further, the regeneration, as already explained, also generates carbon dioxide and hydrogen, which may be used downstream for synthesis of organic compounds, such as methanol, thus adding further value to the process. The process is ideal for processes such as downstream Power-to-X processes.

The gaseous hydrogen is withdrawn from the cathode chamber and the gaseous mixture of oxygen and carbon dioxide is withdrawn from the anode chamber.

Withdrawing hydrogen, oxygen and carbon dioxide from the regeneration process is advantageous as hydrogen and oxygen can be used to generate electricity, e.g. by a fuel cell, to operate the process partly. Further, hydrogen and carbon dioxide ($CO_2$) can be used for synthesis of organic compounds, e.g. methanol, thereby compensating for the cost of running the process.

The carbon capture reaction in the scrubbing step takes place automatically. The operation of the scrubber is thereby an automatic process and requires no power apart from one needed to circulate the liquids. The regeneration process that takes place in the cathode and anode chambers of the electrolytic cell are electrochemical reactions, which inherently require electrical power. The electrochemical process regenerates the solvent, produces hydrogen at the cathode and a mixture of carbon dioxide ($CO_2$) and oxygen at the anode.

The actual power consumption will depend on the technical implementation of the process. Overall, the process requires a large amount of electrical energy rather than heat. This is positive, as electrification of the regeneration in carbon capture processes is highly desired. Further, some of the energy may be recovered as heat for district heating. Regeneration of amine-based scrubbing liquids reduces the overall efficiency of a power plant as some of the heat generated rather than being distributed, has to be used to re-generate the scrubbing liquid. Regeneration of alkaline scrubbing liquids comprising dissolved metal hydroxides may be regenerated electrical energy thus not affecting the overall efficiency of a power plant.

In order to dissolve carbon dioxide and shift the equilibrium towards hydrogen carbonate ($HCO_3^-$) and of carbonate ($CO_3^{2-}$), the first aqueous scrubbing liquid needs to be alkaline, i.e. have a pH exceeding 7, such as 8 or higher.

Thus, the first alkaline, aqueous scrubbing liquid may comprise a metal hydroxide. According to an embodiment of the method, the first alkaline, aqueous scrubbing liquid comprises one or more of dissolved potassium hydroxide (KOH), dissolved sodium hydroxide (NaOH) and dissolved lithium hydroxide (LiOH). The first alkaline, aqueous scrubbing liquid may comprise potassium hydroxide (KOH). Given its high solubility in water, potassium hydroxide (KOH) is a preferred metal hydroxide.

In the anode chamber, a gaseous mixture of oxygen and carbon dioxide is formed. The method may thus further comprise a step of separating this gaseous mixture of oxygen and carbon dioxide into a first stream, rich in oxygen and/or depleted of carbon dioxide, and a second stream, rich in carbon dioxide and/or depleted of oxygen. The gaseous mixture of oxygen and carbon dioxide may be compressed to provide for separation of liquid carbon dioxide ($CO_2$) from gaseous ($O_2$). According to one embodiment of the method, carbon dioxide ($CO_2$) and/or oxygen ($O_2$) withdrawn from the anode chamber is compressed into liquid carbon dioxide and/or compressed oxygen ($O_2$).

Further, hydrogen formed in the cathode chamber is withdrawn. Hydrogen withdrawn from the cathode chamber may be used as a fuel to provide electricity, either internally or externally. Hydrogen and oxygen may be used to fuel a fuel cell. The electricity formed may optionally be used to operate the electrolytic cell regenerating the spent aqueous scrubbing liquid. This is advantageous as it at least partly compensates for the electricity consumption of running the process. Further, it may also be of interest to sell hydrogen on the open market.

The anode chamber is typically not operated such that all hydrogen carbonate ($HCO_3^-$) is converted to carbon dioxide. The method may thus further comprise withdrawing an aqueous stream still comprising some hydrogen carbonate ($HCO_3^-$) from the anode chamber. This stream may be concentrated, such as by reversed osmosis. The resulting concentrated stream comprising hydrogen carbonate ($HCO_3^-$) may be re-circulated to the electrolytic cell, thus facilitating further removal of hydrogen carbonate ($HCO_3^-$).

Typically, the gas comprising carbon dioxide and the scrubbing liquid are fed in contraflow manner to the scrubber to provide for efficient removal of carbon dioxide.

According to one embodiment of the method, the scrubbing of the gas comprising carbon dioxide is performed in at least a first stage and in a second stage. This provides for efficient removal of carbon dioxide, while still providing for optimizing the pH of the spent scrubbing liquid to be regenerated. The scrubbing may be performed in more than two stages.

In scrubbing the gas comprising carbon dioxide in a first stage and in a second stage, the regenerated alkaline, aqueous scrubbing liquid, withdrawn from the cathode chamber, is fed as a second alkaline, aqueous scrubbing liquid to the second stage of scrubbing downstream of the first stage of scrubbing. A second spent scrubbing liquid, resulting from the second stage of scrubbing, is at least partly, fed as the first alkaline, aqueous scrubbing liquid to the first stage of scrubbing upstream of the second stage of scrubbing.

In scrubbing the gas comprising carbon dioxide in several stages, spent scrubbing liquid, resulting from a downstream stage of scrubbing, may be, at least partly, fed as the alkaline, aqueous scrubbing liquid to an upstream stage of scrubbing. Further, the regenerated alkaline, aqueous scrubbing liquid, withdrawn from the cathode chamber, may be fed as an aqueous scrubbing liquid to the last stage of scrubbing downstream. Furthermore, spent scrubbing liquid from the first stage of scrubbing may be fed to the electrolytic cell to be regenerated.

In scrubbing the gas comprising carbon dioxide in a first stage and in a second stage, the pH of the second alkaline, aqueous scrubbing liquid is preferably higher than the pH of the first alkaline, aqueous scrubbing liquid in order to remove carbon dioxide efficiently. The pH of the second alkaline, aqueous scrubbing liquid may be in the range 12 to 14, such as about 13.5. Further, the pH of the first alkaline, aqueous scrubbing liquid may be in the range 8 to 10, such as about 9.

In scrubbing the gas comprising carbon dioxide in several stages, the pH of the aqueous scrubbing liquid will be lower in up-stream stages than in down-stream stages.

In embodiments according to which the scrubbing of the gas comprising carbon dioxide is performed in a first stage and in a second stage, regenerated alkaline, aqueous scrubbing liquid withdrawn from the cathode chamber may be mixed with a part of the second spent scrubbing liquid to provide the second alkaline, aqueous scrubbing liquid. By mixing these liquids, the pH of the second alkaline, aqueous scrubbing liquid is lower than the pH of the regenerated alkaline, aqueous scrubbing liquid withdrawn from the cathode chamber. The pH of the second alkaline, aqueous scrubbing liquid may thus be adjusted by changing the ratio of regenerated alkaline, aqueous scrubbing liquid withdrawn from the cathode chamber to the second spent scrubbing liquid. Further, part of the second spent scrubbing liquid may be mixed with a part of a first spent scrubbing liquid, resulting from the first stage of scrubbing, to provide the first alkaline, aqueous scrubbing liquid. By mixing these liquids, the pH of the first alkaline, aqueous scrubbing liquid will be higher than the pH the first spent scrubbing liquid, and the first spent scrubbing liquid may be partly re-cycled.

In order to further optimize the pH within the electrolytic cell, part of the regenerated alkaline, aqueous scrubbing liquid may be re-circulated to the cathode chamber. The regenerated alkaline, aqueous scrubbing liquid may be diluted by an aqueous stream before re-circulating it to the cathode chamber. This aqueous stream may be provided by withdrawing an aqueous stream still comprising some hydrogen carbonate ($HCO_3^-$) from the anode chamber and concentrating it, such as by reversed osmosis, to provide an aqueous stream depleted of hydrogen carbonate ($HCO_3^-$) and a concentrated stream comprising hydrogen carbonate ($HCO_3^-$).

According to a second aspect, there is in corresponding manner provided a system for scrubbing a gas, such as flue gas or exhaustive gas, comprising carbon dioxide to deplete the flue gas of carbon dioxide. The system comprises a scrubber arrangement for scrubbing a gas with an alkaline, aqueous scrubbing liquid to dissolve carbon dioxide as hydrogen carbonate ($HCO_3^-$) and/or as carbonate ($CO_3^{2-}$) in the alkaline, aqueous scrubbing liquid. The system further comprises a regeneration arrangement for regenerating spent aqueous scrubbing liquid by electrolysis.

The scrubber arrangement comprises a scrubber. The scrubber has an inlet for the gas to be scrubbed and an outlet for a gas depleted of carbon dioxide. The scrubber further has an inlet for receiving the alkaline, aqueous scrubbing liquid and an outlet for withdrawing spent aqueous scrubbing liquid. Preferably, the inlets and outlets are arranged to provide for scrubbing in a counterflow manner.

The regeneration arrangement comprises an electrolytic cell, or a number of electrolytic cells connected in parallel. The electrolytic cell comprises an anode chamber and a cathode camber separated by a membrane. The membrane is permeable to alkali metals, such as lithium, sodium and potassium, but has no or low permeability to hydrogen carbonate ($HCO_3^-$) and/or carbonate ($CO_3^2$). Typically, the membrane is permeable only to cations. The membrane may be a cation-exchange membrane. The anode chamber comprises an anode inlet for receiving the spent aqueous scrubbing liquid from the scrubber arrangement and an anode outlet for withdrawing oxygen and carbon dioxide. The regeneration arrangement may further comprise a filter for filtering spent aqueous scrubbing liquid to be fed to the anode inlet of the anode chamber. Further, the cathode chamber comprises an outlet for withdrawing regenerated aqueous scrubbing liquid and hydrogen. The outlet for spent aqueous scrubbing liquid of the scrubber is in flow communication with the inlet for the spent aqueous scrubbing liquid of the anode chamber. Similarly, the outlet for regenerated aqueous scrubbing liquid of the cathode chamber is flow communication with the inlet for the alkaline, aqueous scrubbing liquid of the scrubber.

An advantage of this system is that it comprises both a scrubber arrangement and a regeneration arrangement where output from the scrubber arrangement can be regenerated by electrolysis and reused in the scrubber arrangement, enabling and optimizing a complete, energy and cost efficient system of depleting gas of carbon dioxide, driven by electrical power.

According to one embodiment, the scrubber arrangement comprises a first and a second buffer tank for alkaline, aqueous scrubbing liquid. Further, the scrubber comprises at least a first and a second absorber. It may comprise more than two absorbers. Further, a number of scrubbers may be used. A number of scrubbers may be either connected in series or in parallel.

The first absorber comprises an inlet for receiving alkaline, aqueous scrubbing liquid from the first buffer tank. Further, the first absorber comprises an outlet for withdrawing spent aqueous scrubbing liquid from first absorber to feed to an inlet of the first buffer tank. Thus, alkaline, aqueous scrubbing liquid may be circulated between the first absorber and the first buffer tank. While the presence of the first buffer tank is preferred, it may according to some embodiments be dispensed with and the alkaline, aqueous scrubbing liquid may be re-circulated over the first absorber by a first pipe system connecting the inlet and the outlet of the first absorber. Further, the first buffer tank is in flow communication with the inlet for the spent aqueous scrubbing liquid of the anode chamber.

The second absorber comprises an inlet for receiving alkaline, aqueous scrubbing liquid from the second buffer tank. Further, the second absorber comprises an outlet for withdrawing spent aqueous scrubbing liquid from second absorber to feed to an inlet of the second buffer tank. Thus, alkaline, aqueous scrubbing liquid may be circulated between the second absorber and the second buffer tank. While the presence of the second buffer tank is preferred, it may according to some embodiments be dispensed with and the alkaline, aqueous scrubbing liquid may be re-circulated over the second absorber by a first pipe system connecting the inlet and the outlet of the second absorber. Further, the outlet for regenerated aqueous scrubbing liquid of the cathode chamber is in flow communication with the inlet of the second absorber. Furthermore, the outlet of the second absorber is in flow communication with the inlet of the first absorber.

If the scrubber arrangement comprises more than two absorbers, they may be arranged such that the outlet of a downstream absorber is in flow communication with the inlet of an upstream absorber. Further, an inlet of the last absorber (i.e. the most downstream absorber close to an outlet for scrubbed gas) is in flow communication with the outlet for regenerated aqueous scrubbing liquid of the cathode chamber. Furthermore, an outlet of the first absorber (i.e. the most upstream close to an inlet for the gas to be scrubbed) is in flow communication with an inlet for the spent aqueous scrubbing liquid of the anode chamber. Typically, the alkaline, aqueous scrubbing liquid may be re-circulated over each absorber by means of a pipe system connecting the inlet and the outlet of the respective absorber. Similar to the first and second absorber, any further absorbers may be in flow communication with a corresponding buffer tank.

To further provide for adjusting flows independently, the scrubber arrangement may further comprise a third buffer tank for regenerated aqueous scrubbing liquid. The third buffer tank is in flow communication with the outlet for regenerated aqueous scrubbing liquid of the cathode chamber and with the inlet of the second absorber. Further, the scrubber arrangement may comprise a fourth buffer tank for spent aqueous scrubbing liquid. The fourth buffer tank is in flow communication with the first buffer tank and with an inlet for the spent aqueous scrubbing liquid of the anode chamber.

This design enables regenerated aqueous scrubbing liquid of the cathode chamber to be reused in the scrubbing process and enables optimization of the pH of the liquids before being recycled into the scrubber.

The regeneration arrangement may further comprise a first compressor unit for compressing hydrogen withdrawn from the cathode chamber and/or a second compressor unit for compressing oxygen and carbon dioxide withdrawn from the anode chamber. Further, regeneration arrangement may comprise a first gas separator for separating oxygen and carbon dioxide withdrawn from the anode chamber from each other. Typically, the first gas separator is arranged downstream the second compressor unit to separate liquid carbon dioxide from gaseous oxygen.

This way the system can provide compressed hydrogen, compressed oxygen and carbon dioxide, as well as separated oxygen and carbon dioxide, for commercial exploration.

According to one embodiment, the regeneration arrangement further comprises a concentrator, such as a filter, for concentrating an aqueous stream comprising some hydrogen carbonate ($HCO_3^-$) withdrawn from the anode chamber to provide a concentrated stream comprising hydrogen carbonate ($HCO_3^-$) and an aqueous stream depleted of hydrogen carbonate ($HCO_3^-$). The concentrator is arranged in flow communication, typically by pipes, with the electrolytic cell such that:

the aqueous stream comprising some hydrogen carbonate ($HCO_3^-$) may be withdrawn from the anode chamber and fed to the concentrator;

the concentrated stream comprising hydrogen carbonate ($HCO_3^-$) may be withdrawn from the concentrator and fed to the anode chamber; and/or the aqueous stream depleted of hydrogen carbonate ($HCO_3^-$) may be withdrawn from the concentrator and fed to the cathode chamber.

The regeneration arrangement may further comprise a first balance tank for regenerated alkaline, aqueous scrubbing liquid. The first balance may be arranged in flow communication, typically by pipes, with the electrolytic cell and it may have:

a first inlet for receiving regenerated alkaline, aqueous scrubbing liquid from the cathode chamber;

a second inlet for receiving the aqueous stream depleted of hydrogen carbonate ($HCO_3^-$) withdrawn from the concentrator; and/or an outlet for feeding diluted regenerated alkaline, aqueous scrubbing liquid to the cathode chamber of electrolytic cell.

Further, the regeneration arrangement may comprise a second balance tank for spent aqueous scrubbing liquid. The second balance may be arranged in flow communication, typically by pipes, with the electrolytic cell and it may have:

a first inlet for receiving spent aqueous scrubbing liquid from the scrubber arrangement;

a second inlet for receiving the concentrated stream comprising hydrogen carbonate ($HCO_3^-$) from the concentrator; and/or an outlet for feeding spent aqueous scrubbing liquid to the anode chamber of the electrolytic cell.

In scrubbing flue gas in a power plant, the scrubbing and the regeneration are typically run continuously at the plant. It is however possible to run the scrubbing separately from the regeneration. As an example, the scrubbing may be operated in a vehicle, whereas the regeneration takes place at a central unit, which may serve several vehicles. The vehicle may be provided with a scrubber arrangement comprising a third buffer tank for regenerated aqueous scrubbing liquid and a fourth buffer tank for spent aqueous scrubbing liquid. By providing the vehicle with such a scrubber arrangement, it may be run independently of the rearrangement until the third buffer tank runs empty and/or the fourth buffer tank becomes full.

According to a third aspect, there is thus provided scrubber arrangement for scrubbing a gas, such as flue gas, comprising carbon dioxide to deplete the flue gas of carbon dioxide. As already described above, the scrubber arrangement comprises a scrubber having an inlet for the gas to be scrubbed and an outlet for gas depleted of carbon dioxide. The scrubber further has an inlet for receiving the alkaline, aqueous scrubbing liquid and an outlet for withdrawing spent aqueous scrubbing liquid. The scrubber arrangement comprises a first and a second buffer tank for alkaline, aqueous scrubbing liquid, and the scrubber at least comprises a first and a second absorber. The first absorber comprises an inlet for receiving alkaline, aqueous scrubbing liquid from the first buffer tank and an outlet for withdrawing spent aqueous scrubbing liquid and feed it to an inlet of the first buffer tank. Thus, alkaline, aqueous scrubbing liquid may be circulated between the first absorber and the first buffer tank. While the presence of the first buffer tank is preferred, it may according to some embodiments be dispensed with and the alkaline, aqueous scrubbing liquid may be re-circulated over the first absorber by a first pipe system connecting the inlet and the outlet of the first absorber. The second absorber comprises an inlet for receiving alkaline, aqueous scrubbing liquid from the second buffer tank and an outlet for withdrawing spent aqueous scrubbing liquid from the second absorber to feed to an inlet of the second buffer tank. Thus, alkaline, aqueous scrubbing liquid may be circulated between the second absorber and the second buffer tank. While the presence of the second buffer tank is preferred, it may according to some embodiments be dispensed with and the alkaline, aqueous scrubbing liquid may be re-circulated over the second absorber by a second pipe system connecting the inlet and the outlet of the first absorber. The outlet of the second absorber is in flow communication with the inlet of the first absorber.

If the scrubber arrangement comprises more than two absorbers, they may be arranged such that the outlet of a downstream absorber is in flow communication with the inlet of an upstream absorber. Further, an inlet of the last absorber (i.e. the most downstream absorber close to an outlet for scrubbed gas) is in flow communication with the outlet for regenerated aqueous scrubbing liquid of the cathode chamber. Furthermore, an outlet of the first absorber (i.e. the most upstream close to an inlet for the gas to be scrubbed) is in flow communication with an inlet for the spent aqueous scrubbing liquid of the anode chamber. Typically, the alkaline, aqueous scrubbing liquid may be re-circulated over each absorber by means of a pipe system connecting the inlet and the outlet of the respective absorber. Similar to the first and second absorber, any further absorbers may be in flow communication with a corresponding buffer tank.

According to one embodiment, the scrubber arrangement further comprises a third buffer tank for regenerated aqueous scrubbing liquid. The third buffer tank has an inlet for receiving regenerated aqueous scrubbing liquid, such that the third buffer tank may be filled up with regenerated aqueous scrubbing liquid. Further, the third buffer tank is in flow communication with the inlet of the second absorber.

Furthermore, the scrubber arrangement may comprise a fourth buffer tank for spent aqueous scrubbing liquid. The fourth buffer tank is in flow communication with the first buffer tank, such that the fourth buffer tank may be filled up with regenerated aqueous scrubbing liquid in operating the scrubber arrangement. The fourth buffer tank further has an outlet for withdrawing spent aqueous scrubbing liquid, such that the fourth buffer tank may be emptied.

By providing such a scrubber arrangement, it can be utilized without being directly connected to any regeneration arrangement. It may for example be installed in a vehicle for scrubbing an exhaust gas obtained in the operation of the vehicle. The third buffer tank can be filled with alkaline, aqueous scrubbing liquid to be used in the scrubbing process. Spent aqueous scrubbing liquid can be withdrawn from the fourth buffer tank to empty it at a convenient time point, such as when re-fueling the vehicle, for it to be emptied after being filled up during the process.

Correspondingly, there is, according to a fourth aspect, provided a regeneration arrangement for regenerating a spent aqueous scrubbing liquid comprising hydrogen carbonate ($HCO_3^-$) and/or carbonate ($CO_3^{2-}$) used in electrolysis to provide alkaline, aqueous scrubbing liquid. The regeneration arrangement has already been described herein above. It comprises an electrolytic cell. The electrolytic cell comprises an anode chamber and a cathode camber separated by a membrane. The anode is present within the anode chamber and the cathode is present within the cathode chamber. The anode chamber comprises an anode inlet for receiving the spent aqueous scrubbing liquid and an anode outlet for withdrawing oxygen and carbon dioxide. The regeneration arrangement may further comprise a filter for filtering spent aqueous scrubbing liquid to be fed to the anode inlet of the anode chamber. The cathode chamber comprises an outlet for withdrawing regenerated aqueous scrubbing liquid and hydrogen. The regeneration arrangement further comprises a concentrator for concentrating an aqueous stream comprising some hydrogen carbonate ($HCO_3^-$) withdrawn from the anode chamber to provide a concentrated stream comprising hydrogen carbonate ($HCO_3^-$) and an aqueous stream depleted of hydrogen carbonate ($HCO_3^-$). The concentrator is arranged in flow communication with the electrolytic cell such that the aqueous stream comprising some hydrogen carbonate ($HCO_3^-$) may be withdrawn from the anode chamber and fed to the concentrator, the concentrated stream comprising hydrogen carbonate ($HCO_3^-$) may be withdrawn from the concentrator and fed to the anode chamber, and the aqueous stream depleted of hydrogen carbonate ($HCO_3^-$) may be withdrawn from the concentrator and fed to the cathode chamber.

The regeneration arrangement may further comprise a first balance tank for regenerated alkaline, aqueous scrubbing liquid. The first balance tank has a first inlet for receiving regenerated alkaline, aqueous scrubbing liquid, and a second inlet for receiving the aqueous stream depleted of hydrogen carbonate ($HCO_3^-$) withdrawn from the concentrator. Further, the first balance tank has an outlet for feeding diluted regenerated alkaline, aqueous scrubbing liquid to the cathode chamber of electrolytic cell. Furthermore, regeneration arrangement may comprise a third buffer tank for storing regenerated aqueous scrubbing liquid. The third buffer tank has an inlet for receiving regenerated aqueous scrubbing liquid, such that the third buffer tank may be filled up with regenerated aqueous scrubbing liquid. Further, the third buffer tank has an outlet for withdrawing regenerated aqueous scrubbing liquid in filling up a corresponding buffer tank of the scrubbing system.

The regeneration arrangement may further comprise a second balance tank for spent aqueous scrubbing liquid. The second balance tank has a first inlet for receiving spent aqueous scrubbing liquid from the scrubber arrangement, a second inlet for receiving the concentrated stream comprising hydrogen carbonate ($HCO_3^-$) from the concentrator, and an outlet for feeding spent aqueous scrubbing liquid to the anode chamber of electrolytic cell. Furthermore, the regeneration arrangement may comprise a fourth buffer tank for spent aqueous scrubbing liquid. The fourth buffer tank is in flow communication with the anode chamber, such that spent aqueous scrubbing liquid to be regenerated, may be withdrawn from the fourth buffer tank. Furthermore, the fourth buffer tank has inlet for receiving spent aqueous scrubbing liquid. Thus, the fourth buffer tank may be filled up in emptying a corresponding buffer tank of the scrubbing system.

The regeneration arrangement may further comprise a first compressor unit for compressing hydrogen withdrawn from the cathode chamber. Further, the regeneration arrangement may comprise a second compressor unit for compressing oxygen and carbon dioxide withdrawn from the anode chamber, and/or a first gas separator for separating oxygen and carbon dioxide withdrawn from the anode chamber from each other. Typically, the first gas separator is arranged downstream the second compressor unit to separate liquid carbon dioxide from gaseous oxygen.

Although the present invention has been described above with reference to specific embodiments, it is not intended to be limited to the specific form set forth herein. Rather, the invention is limited only by the accompanying claims and other embodiments than the specific embodiments described above are equally possible within the scope of these appended claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous.

In addition, singular references do not exclude a plurality. The terms "a", "an", "first", "second" etc. do not preclude a plurality.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DETAILED DESCRIPTION

Figure 1:
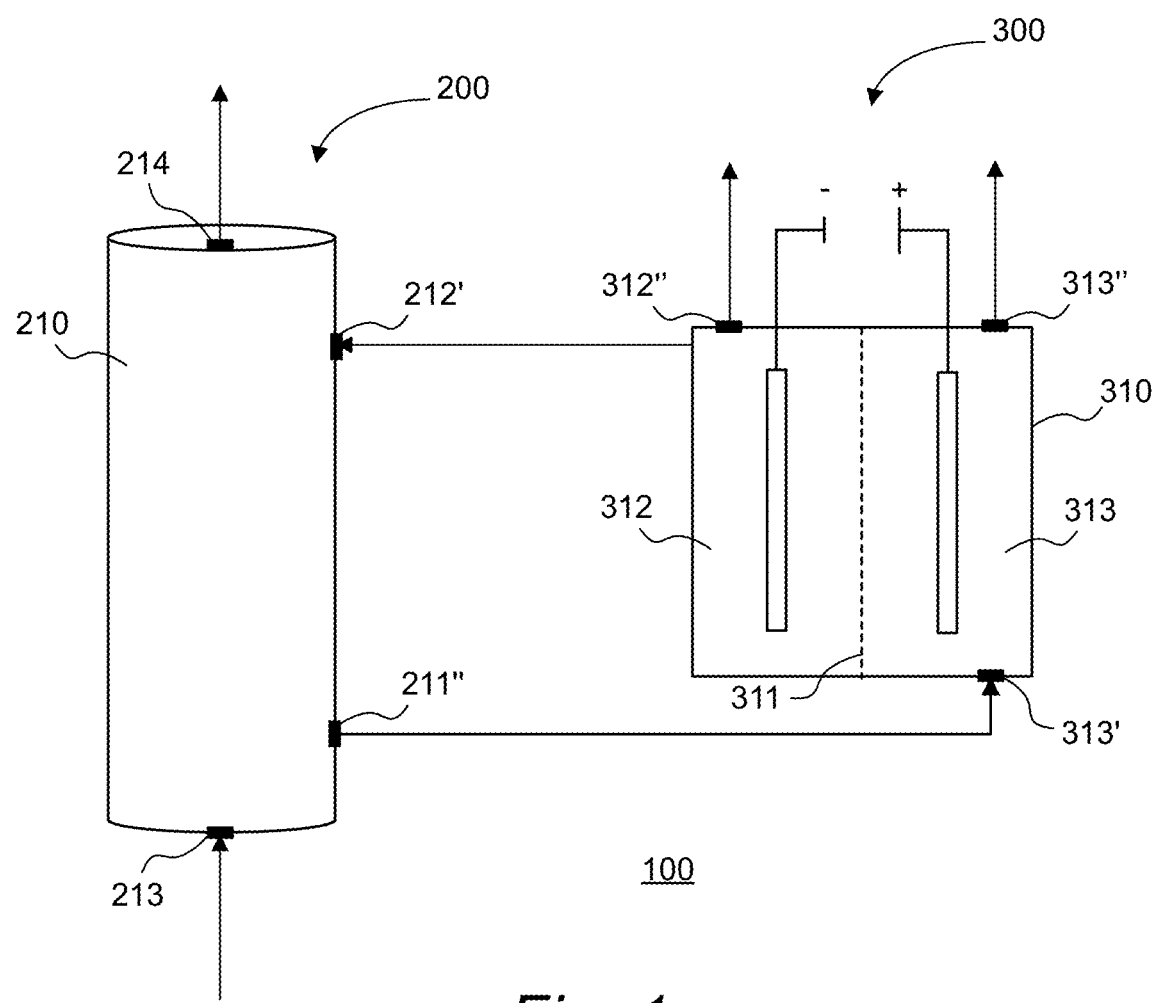
FIG. 1 shows a flow path between a scrubber and an electrolytic cell.

With reference to FIG. 1, a system 100 according to an embodiment is shown having a scrubber arrangement 200 and a regeneration arrangement 300. Here, a method of scrubbing a gas, such as flue gas or an exhaustive gas, comprising carbon dioxide $CO_2$, is illustrated. The gas enters the scrubber through the scrubber inlet 213. To deplete the flue gas from carbon dioxide $CO_2$, the scrubbing method can be described as follows. The gas is scrubbed in the scrubber 210 in a counter flow manner with a first alkaline, aqueous scrubbing liquid to dissolve carbon dioxide $CO_2$ as hydrogen carbonate $HCO_3^-$ and/or as carbonate $CO_3^{2-}$ in the first alkaline, aqueous scrubbing liquid. A first spent aqueous scrubbing liquid comprising dissolved hydrogen carbonate $HCO_3^-$ and/or carbonate $CO_3^{2-}$ results. The first spent aqueous scrubbing liquid has a pH from about 7 to about 9 when it leaves at the outlet 211" for withdrawing spent aqueous scrubbing liquid of the scrubber 210. The first spent aqueous scrubbing liquid is then fed to an anode chamber 313 of an electrolytic cell 310 via an anode inlet 313'. The electrolytic cell 310 has apart from the anode chamber 313 also a cathode chamber 312. The anode chamber 313 and the cathode chamber 312 are separated by a membrane 311. This membrane 311 may be a semi-permeable membrane, being permeable to cations, but essentially impermeable to anions. Thus, the membrane cation-exchange membrane. The electrolysis increases the pH of the first spent aqueous scrubbing liquid in the cathode chamber 312. In the anode chamber 313, the electrolysis further depletes the first spent aqueous scrubbing liquid of hydrogen carbonate $HCO_3^-$ and of carbonate $CO_3^{2-}$ by decreasing the pH-value to release gaseous carbon dioxide. The outlet 211" for spent aqueous scrubbing liquid of the scrubber 210 is in flow communication with the inlet 313' for the spent aqueous scrubbing liquid of the anode chamber 313. Moreover, the outlet 312" for regenerated aqueous scrubbing liquid of the cathode chamber 312 is flow communication with the inlet 212' for the alkaline, aqueous scrubbing liquid of the scrubber 210.

One can say that the first spent aqueous scrubbing liquid is regenerated by generating gaseous hydrogen $H_2$ and dissolved hydroxide ions $OH^-$ in the cathode chamber 312 and a gaseous mixture of oxygen $O_2$ and carbon dioxide $CO_2$ in the anode chamber 313 by electrolysis. This is indicated by the upwards pointing arrows from the cathode outlet 312" and the anode outlet 313" in FIG. 1, respectively. The gaseous hydrogen $H_2$ and dissolved hydroxide ions $OH^-$ is withdrawn from the cathode chamber 312 and the gaseous mixture of oxygen $O_2$ and carbon dioxide $CO_2$ is withdrawn from the anode chamber 313. For instance, the hydrogen $H_2$ may be used in downstream processes (not shown) such as in fuel or methanol production. The regenerated alkaline, aqueous scrubbing liquid from the cathode chamber 312 is then recirculated via the inlet 212' for receiving the alkaline, aqueous scrubbing liquid to the scrubber 210. Gas depleted of carbon dioxide $CO_2$ then exits the scrubber 210 via the scrubber outlet 214.

Figure 2:
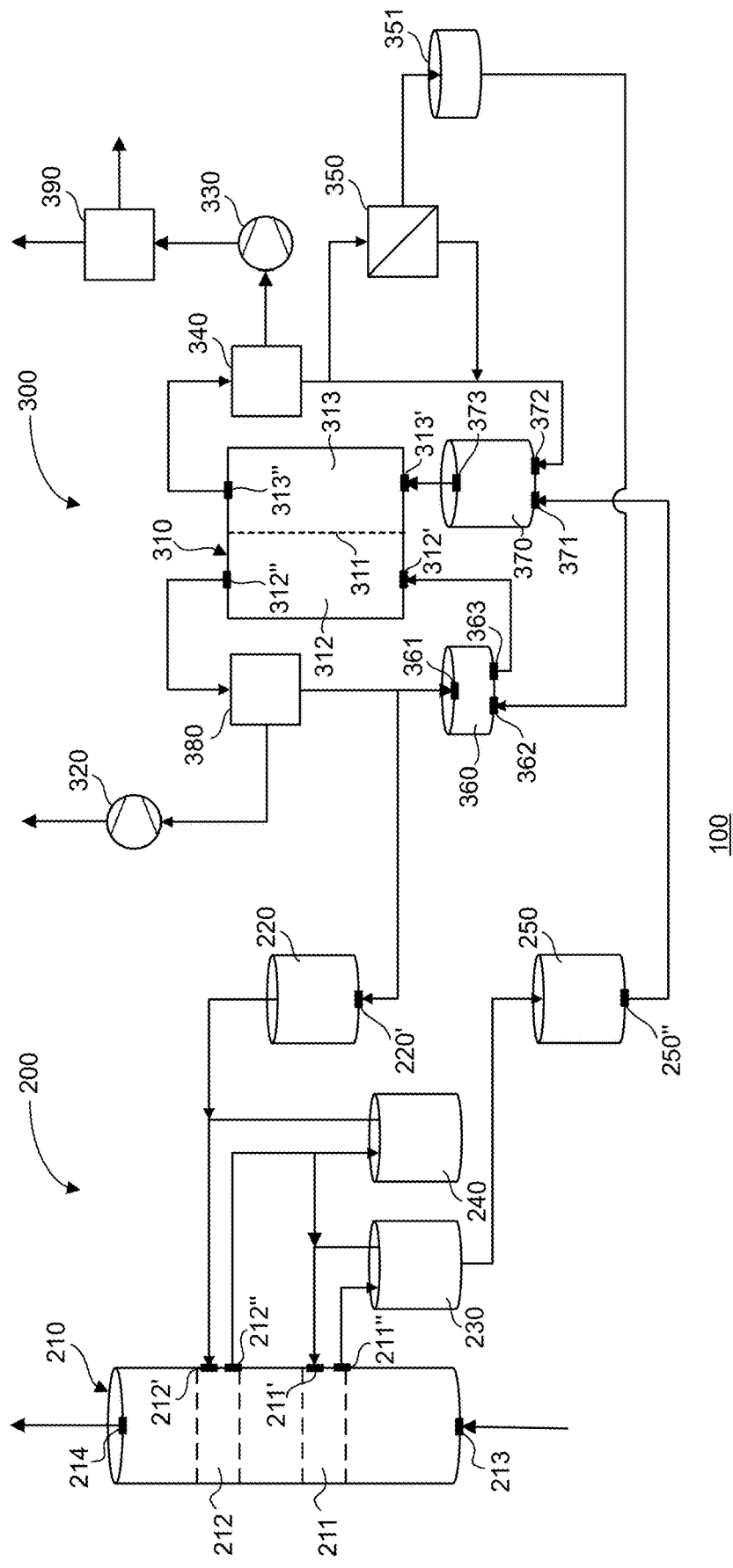
FIG. 2 shows a process scheme of a system for scrubbing flue gas.

In FIG. 2, a detailed view of the system 100 descried in relation to FIG. 1 is shown. The system is separated into two parts; the scrubber arrangement 200 and the regeneration arrangement 300. These two arrangements are also shown separately in FIGS. 3 and 4, respectively. For increased understanding, the scrubber arrangement 200 and the regeneration arrangement 300 will now be described separately. The dotted arrows in FIGS. 3 and 4 indicate where the scrubber arrangement 200 and the regeneration arrangement 300 may meet in FIG. 2 to form the system 100 in its entirety. Alternatively, the scrubber arrangement 200 and the regeneration arrangement 300, may be operated independently.

Figure 3:
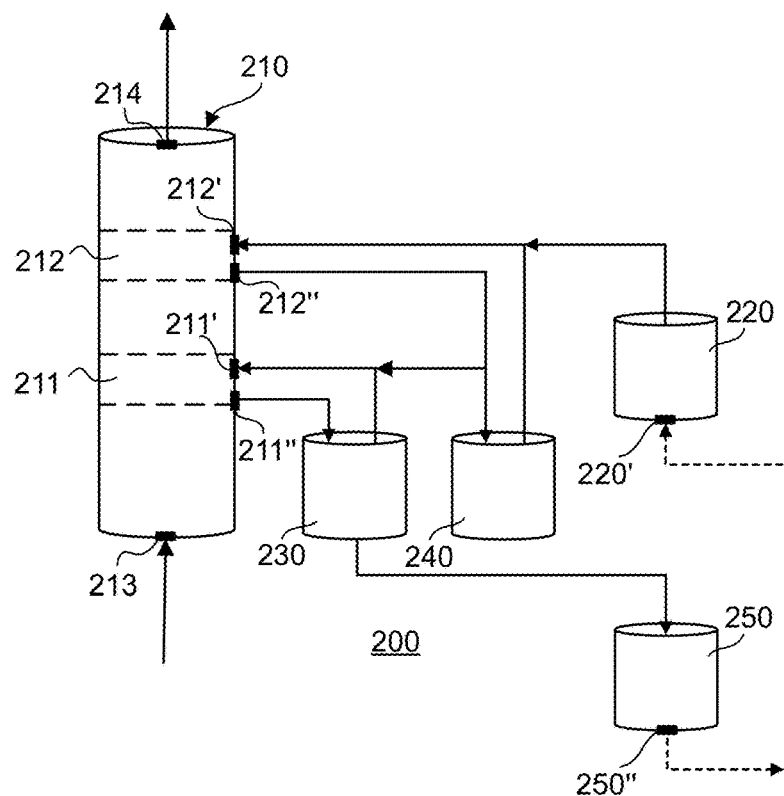
FIG. 3 shows a scrubber arrangement of the process scheme of FIG. 2.

With reference to FIG. 3, the scrubber arrangement 200 has a first buffer tank 230 and a second buffer tank 240 for alkaline, aqueous scrubbing liquid. The scrubber 210 has a first absorber 211 and a second absorber 212 for scrubbing the gas of carbon dioxide. Scrubbing liquid may be re-circulated to the first absorber 211 via the first buffer tank 230. Further, scrubbing liquid may be re-circulated to the second absorber 212 via the second buffer tank 240. The first absorber 211 thus has an inlet 211' for receiving alkaline, aqueous scrubbing liquid from the first buffer tank 230, and an outlet 211" for withdrawing spent aqueous scrubbing liquid and feeding it to the inlet 313' for the spent aqueous scrubbing liquid of the anode chamber 313 directly (as shown in FIG. 1) or via the first buffer tank 230, as shown in FIGS. 2 and 3. The second absorber 212 has an inlet 212' for receiving alkaline, aqueous scrubbing liquid from the second buffer tank 240 and an outlet 212" for withdrawing spent aqueous scrubbing liquid and feeding it to the inlet 211' of the first absorber and/or to the second buffer tank 240. The outlet 212" of the second absorber is in flow communication with the second buffer tank 240 and the inlet 211' of the first absorber 211. Thus, regenerated alkaline, aqueous scrubbing liquid may be mixed with spent aqueous scrubbing liquid from the second absorber 212 before being fed as alkaline, aqueous scrubbing liquid to the second absorber 212. Further, spent aqueous scrubbing liquid from the second absorber 212 may be mixed with spent aqueous scrubbing liquid from the first absorber 211 before being fed as alkaline, aqueous scrubbing liquid to the first absorber 211. By controlling the flow rates in the scrubber arrangement 200, as well as the mixing ratios, not only the scrubbing efficiency, but also the pH of the spent aqueous scrubbing liquid to be regenerated may be controlled.

In accordance with the description of FIG. 1, flue gas enters the scrubber 210 via the scrubber inlet 213. The scrubbing is then performed in two stages. The first stage takes place in the first absorber 211 and the second stage takes place in the second absorber 212. The scrubbing is performed in a counter flow manner, with the second absorber 212 arranged downstream of the first absorber 211.

As mentioned, the scrubber arrangement 200 also has a third buffer tank 220 for regenerated aqueous scrubbing liquid. This third buffer tank 220 is in flow communication with the outlet 312" for regenerated aqueous scrubbing liquid of the cathode chamber 312 and with the inlet 212' of the second absorber 212. The scrubber arrangement 200 also has a fourth buffer tank 250 for spent aqueous scrubbing liquid. This fourth buffer tank 250 is in flow communication with the first buffer tank 230 and with the inlet 313' for the spent aqueous scrubbing liquid of the anode chamber 313. The fourth buffer tank 250 also has an outlet for withdrawing spent aqueous scrubbing liquid and delivering to the electrolytic cell 310 via the anode inlet 313'.

Figure 4:
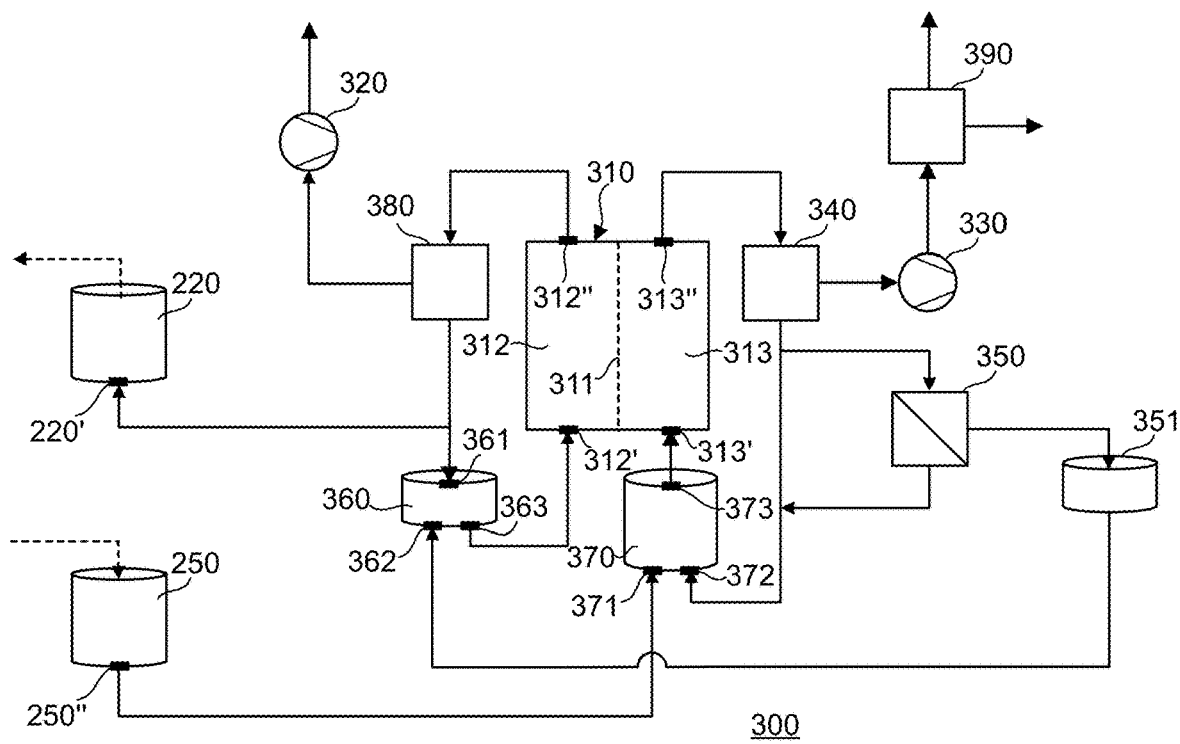
FIG. 4 shows a regeneration arrangement of the process scheme of FIG. 2.

If the scrubber arrangement 200 is arranged separately from the regeneration arrangement 300, such as in a vehicle, also the regeneration arrangement 300, such as a charging station or vehicle depot, may comprise a third buffer tank 220 and a fourth buffer tank 250 as shown in FIG. 4.

Now turning to the regeneration arrangement 300 in FIG. 4. Other than the electrolytic cell 310 and its components, which have been previously described in relation to FIG. 1, the regeneration arrangement 300 further comprises a first compressor unit 320 for compressing hydrogen gas withdrawn from the cathode chamber 312. Moreover, the regeneration arrangement 300 further comprises a second compressor unit 330 for compressing oxygen and carbon dioxide withdrawn from the anode chamber. Furthermore, the regeneration arrangement 300 also comprises a first gas separator 340 for separating oxygen $O_2$ and carbon dioxide $CO_2$ withdrawn from the anode chamber 313 from liquid. The first gas separator 340 is arranged upstream the second compressor unit 330. The regeneration arrangement 300 also comprises a second gas separator 380 for separating gaseous hydrogen $H_2$ and, for instance, liquid aqueous potassium hydroxide KOH, withdrawn from the cathode chamber 312. When the system 100 is operating, the oxygen $O_2$ and carbon dioxide $CO_2$ leaving the first gas separator 340 is compressed. The composition is then typically around 75% $CO_2$ and 25% $O_2$. They may for instance be compressed at about 50 bar at 10° C. where carbon dioxide $CO_2$ is liquefied and oxygen $O_2$ still is in gaseous phase. An advantage of keeping $CO_2$ in a liquid phase is that it is practical during transportation. For instance, a third separator 390 is present downstream of the compressor to separate the oxygen from the liquefied carbon dioxide.

Furthermore, the regeneration arrangement 300 has a separator 350, such as a filter. For instance, the filter may be a reversed osmosis filter. This concentrator 350 is arranged downstream of the first gas separator 340. After passing the first gas separator, the fluid contains an aqueous stream comprising some hydrogen carbonate $HCO_3^-$ withdrawn from the anode chamber 313. The concentrator is configured to provide, such as by filtration, a concentrated stream of hydrogen carbonate $HCO_3^-$ and an aqueous stream depleted of hydrogen carbonate $HCO_3^-$. The concentrator 350 is in flow communication with the electrolytic cell 310 such that the aqueous stream comprising some hydrogen carbonate $HCO_3^-$ is withdrawn from the anode chamber 313 and fed to the concentrator 350. The concentrated stream of hydrogen carbonate $HCO_3^-$ may be withdrawn from the concentrator 350 and fed to the anode chamber 313. Further, the aqueous stream depleted of hydrogen carbonate $HCO_3^-$ may be withdrawn from the concentrator 350 and fed to the cathode chamber 312.

The regeneration arrangement 300 also has a first balance tank 360 for regenerated alkaline, aqueous scrubbing liquid. The first balance tank 360 has a first inlet 361 for receiving regenerated alkaline, aqueous scrubbing liquid from the second gas separator 380. The first balance tank 360 also has a second inlet 362 for receiving the aqueous stream depleted of hydrogen carbonate $HCO_3^-$ from a third balance tank 351, withdrawn from the concentrator 350. Further, it has an outlet 363 for feeding diluted regenerated alkaline, aqueous scrubbing liquid to the cathode chamber 312 of the electrolytic cell 310.

The regeneration arrangement 300 may also have a second balance tank 370 for spent aqueous scrubbing liquid. The second balance tank 370 has a first inlet 371 for receiving spent aqueous scrubbing liquid from the scrubber arrangement 200, in particular via the fourth buffer tank 250. Further, it has a second inlet 372 for receiving the concentrated stream comprising hydrogen carbonate $HCO_3^-$ from the concentrator 350. It also has an outlet 373 for feeding spent aqueous scrubbing liquid to the anode chamber 313 of the electrolytic cell 310.

To further describe the relationship between the scrubber arrangement 200 and the regeneration arrangement 300, the following description is provided. The regenerated alkaline, aqueous scrubbing liquid withdrawn from the cathode chamber 312 of the electrolytic cell 310 is fed as a second alkaline, aqueous scrubbing liquid to the second stage of scrubbing downstream of the first stage of scrubbing. The second stage of scrubbing may be defined as the process of the second absorber 212. A second spent scrubbing liquid, resulting from the second stage of scrubbing in the second absorber 212, is at least partly fed as the first alkaline, aqueous scrubbing liquid to the first stage of scrubbing upstream of the second stage of scrubbing, i.e. in the first absorber 211.

The pH-value of the second alkaline, aqueous scrubbing liquid entering the second absorber 212 is rather high. Preferably, the pH of the second alkaline, aqueous scrubbing liquid is about 12 to 14. This is higher than the pH of the first alkaline, aqueous scrubbing liquid leaving the first absorber 211 on its way to the electrolytic cell 310. Preferably, the pH of the first alkaline, aqueous scrubbing liquid is about 8 to 10.

It is to be noted that the electrolytic cell may be sensitive to impurities in the fluid flowing through the anode and cathode chambers. Hence, there may also be a separate cleaning unit (not shown), which serves to remove impurities such as for instance nitrogen oxides NOx and sulfur oxides SOx from the spent aqueous scrubbing liquid before it enters the electrolytic cell 310. As an example, the cleaning unit may include a filter to remove particulate matter.

It should be noted that in all FIGS. 1-4, the direction of the arrows corresponds to the direction of flow of the fluids circulating in the system 100. Further, the lines of the arrows indicate a fluid or flow communication between the elements of the system.

Chemical Processes

The chemical processes occurring in the system 100 may be divided into two different parts, namely carbon capture and electrochemical regeneration, respectively. The overall reaction electrochemically splits water to oxygen and hydrogen according to the following formula:

$$2 \times H_2O \rightarrow O_2 + 2 \times H_2$$

The chemical reactions have been balanced for the overall process of capturing $4 \times CO_2$ molecules.

The Scrubber

In short, carbon is captured in the scrubber 210 by dissolving carbon dioxide in the alkaline, aqueous scrubbing liquid. This reaction takes place automatically in accordance with the following formula:

$$4 \times OH^- + 4 \times CO_2 \rightarrow 4 HCO_3^-$$

The solvent is then regenerated in the regeneration arrangement 300 using electrochemistry. In general, the electrochemical reaction can be split into two parts; the anode reaction and the cathode reaction. These reactions will be described below.

The Anode

In the anode chamber 313, $O_2$ and $CO_2$ is generated in two different steps. First, $O_2$ is generated at the anode together with 4 $H^+$. Then, the $H^+$ decreases the pH-value of the solvent and releases $CO_2$. Simultaneously, $O_2$ is generated at the anode and the two gases are mixed in a ratio of 4:1, $CO_2$ to $O_2$. The overall reaction at the anode chamber 313 is:

$$4 \times HCO_3^- \rightarrow O_2 + 4 \times CO_2 + 2 \times H_2O + 4e^-$$

The reaction at the anode is:

$$2 \times H_2O \rightarrow O_2 + 4 \times H^+ + 4e^-$$

This reaction decreases the pH-value locally. This decrease in pH-value pushes the $HCO_3^-/CO_2$ equilibrium to the right, such that:

$$4 \times H^+ + 4 \times HCO_3^- \rightarrow 4 \times CO_2 + 4 \times H_2O$$

which results in the release of gaseous $CO_2$ from the solvent.

The Cathode

At the cathode, $H_2$ is produced together with $OH^-$. This reaction both generates valuable $H_2$ for downstream applications and regenerates the alkaline solvent comprising hydroxide ions ($OH^-$) for the carbon capture process. The cathode chamber reaction 312 is:

$$4 \times H_2O + 4^- \rightarrow 2 \times H_2 + 4 \times OH^-.$$

Scrubbing Liquid

Ethanolamine (MEA) is an amine used for carbon capture used in conventional scrubbers. It has been suggested that MEA may act as a promoter for the process of scrubbing for instance flue gas. MEA indeed is known to capture $CO_2$ faster than a hydroxide solution. An envisaged idea has therefore been to combine the carbon capture capabilities of MEA with the electrochemical properties of the hydroxide solution. However, experimental tests have indicated that MEA unfortunately behaves undesirably in an electrochemical cell. MEA appears to be reduced at the cathode, which would reduce the carbon capturing capabilities of the solvent, which is highly unwanted. Thus, using a metal hydroxide, e.g. potassium or sodium hydroxide, is preferred in the system 100 disclosed herein.

Power Need

The electrochemical reaction in the electrolytic cell 310 requires electrical power. The actual power consumption will depend on the technical implementation of the process of the system 100. Assuming 100% efficiency, the minimum current required for the process can be calculated using Faraday's law of thermodynamics: $I = mFz/tM$. With the parameters as listed in Table 1 below, the current can be calculated.

TABLE 1 parameters for calculating the minimum current required for the process

| Symbol | Quantity | Value |
|---|---|---|
| m | Mass of $O_2$ | 182 kg |
| F | Faraday's constant | 96485 C/mol |
| z | Valency number of electrons | 2 |
| t | Time | 1 s |
| M | Molar mass of $O_2$ | 32 g/mol |

The current can thus be calculated to $I = 1.09 \times 10^9$ A. With a minimum voltage of 2 V assumed, the theoretical minimum power consumption for 1 ton of $CO_2$ will be:

$$P_{min} = 2V \times 1.09 \times 10^9 \, A = 2.18 \times 10^9 \, J = 2.18 \, GJ.$$

For real chemical reactions, a higher energy consumption is expected. As suggested by a model based on experiments the ultimate power consumption for the capture of $CO_2$ and regeneration of the solvent is predicted to 5.88 GJ per 1 ton of $CO_2$. This process regenerates the solvent, produces $H_2$ at the cathode 312 and a mixture of $CO_2$ and $O_2$ at the anode.

Further energy is required for the separation of the $CO_2$ and $O_2$ from the first gas separator 340. This separation may for instance be done cryogenically. Energy consumption for $CO_2$ cryogenically separated from $CH_4$ has been studied in the literature for biogas purposes. For cryogenic separation, $CH_4$ and $O_2$ have similar physio-chemical properties, as the $CO_2$ is removed by cooling. The energy consumption for separation of $O_2$ and $CO_2$ in the first gas separator 340 is expected to be $1.4 \pm 0.4$ MJ per kg $CO_2$.

$CO_2$ and $H_2$ is typically produced in a ratio of 2:1. If the downstream application is methanol production, the suitable stoichiometric ratio is 1:3 and additional $H_2$ is required for this process. Commercial electrolysis equipment produces $H_2$ with an energy consumption of 55 kWh/kg. For 1 ton of $CO_2$, the $H_2$ requirements are therefore $(m_{CO2}M_{CO2}) \times 3 = 68182$ mol, which equals: 68182 mol $\times$ 2 g/mol $\times$ 55 kWh/kg = 7500 kWh = 26.98 GJ. The carbon capture regeneration process produced $H_2$ corresponding to 4.5 GJ, and the remaining energy requirements for $H_2$ production is therefore: 26.98 GJ - 4.50 GJ = 22.48 GJ.

The power consumption of the carbon capture process is determined primarily by the electrochemical cell. The purification of $CO_2$ requires additional energy. However, the substantially largest energy consumption comes from the $H_2$ production. The carbon capture and purification alone is expected to cost in the order of 7.28 GJ per ton of $CO_2$. This includes the production of $H_2$ corresponding to 4.5 GJ as already mentioned. Commercial values for $CO_2$ capture with amine scrubbers are currently 3.7 GJ per ton of $CO_2$. This is without the generation of $H_2$ and the $CO_2$ purification. Hence, if the $CO_2$ is used downstream of the electrolytic cell 310 together with $H_2$ to make for instance methanol, the process disclosed herein will be beneficial.

Using the values from an experimental model, the methanol produced from 1000 kg of $CO_2$ would costs about 2.5 kr/l, see Table 2 below. This price (Danish krone) is calculated based only on energy consumption and does not take material and personal into account.

TABLE 2

Energy consumption of producing methanol from 1000 kg of $CO_2$

| Process | Energy consumption |
|---|---|
| Case: | 1000 kg $CO_2$ |
| Carbon capture and regeneration | 5.88 GJ |
| $CO_2$ purification | 1.4 GJ |
| $H_2$ production | 22.48 GJ |
| Overall | 29.76 GJ = 8267 kWh |
| Production | 728 kg = 919 l methanol |
| Electricity price | 0.3 kr/kWh |
| Carbon tax (saved) | 182 kr |
| Price | 2.5 kr/l |

Currently, methanol made from non-renewable sources is sold at the price of 1.66 kr/l. The price of 2.5 kr/l is higher than 1.66 kr/l. However, currently, it is expected that green methanol would have a higher price than black methanol. Furthermore, the price is highly linked to the electricity price. However, as the carbon tax is expected to increase, as well as the cost for emission rights, the need and request for methanol production will increase in the industry and the system 100 provided herein will be beneficial to meet this increased demand.

EXPERIMENTAL SECTION

Example 1

In the following, a $CO_2$ capture from a power plant generating 10 MW heat and power from biomass is presented in relation to three process steps; "scrubber", "regeneration" and "separation", see Table 3. Overall, the process requires a large amount of electrical energy. This is positive, as electrification of the carbon capture process is highly wanted and completely new. Some of the energy may be recovered as heat for district heating.

TABLE 3

10 MW power plant CO2 capture

| Process | Scrubber | Regeneration | Separation |
|---|---|---|---|
| In | Gas with ~10% $CO_2$ 2 ton $CO_2$/h Lean liquid 400 m³/h | Saturated liquid 400 m³/h Power 3.2 MW | Gas: 80% $CO_2$ and 20% $O_2$ 2 ton/h $CO_2$ Power 0.76 MW |
| Out | Gas without $CO_2$ Saturated liquid 400 m³/h | Lean liquid 400 m³/h Gas: $H_2$ 45 kg/h Gas: 80% $CO_2$ and 20% $O_2$ 2 ton/h $CO_2$ | Gas: pure $CO_2$ 2 ton/h $CO_2$ |
| Operation | Automatic process | Uses power | Uses power |

Example 2

To verify the applicability of the process using the system 100 as described herein, laboratory tests have been performed.

In the laboratory tests, a standard electrolysis cell from EC Electrocell, model Electro MP Cell was used. The electrolysis cell was provided with a Nafion 117 membrane. In operating the cell, a 1.5 M $KHCO_3$ solution was circulated over the anode side from a combined degassing/circulation tank. The liquid was circulated at 1.5 L/min. Similarly, a 1.5 M KOH solution was circulated over the cathode side from a combined degassing/circulation tank. The liquid was circulated at 1.5 L/min. Standard flowmeters and lab pumps were used. Gas flow from the degassing tanks were measured by an Aalborg GFM gas flow meter. $CO_2$ content were measured using a Guardian NG from Edinburgh Sensors. A standard heat plate was used to keep a constant temperature of the liquid at 40 degrees Celsius during the experiments. The pH and temperature were measured in the circulation tanks using standard online pH and temperature meters. The current density applied to the electrolyzer were varied between 1-4 kA/m², using a standard power converter.

The results are presented in FIGS. 5-8. It is clear that the pH-value of the scrubbing liquid entering the electrolytic cell 310 plays an important part in the production of gases.

Figure 5:
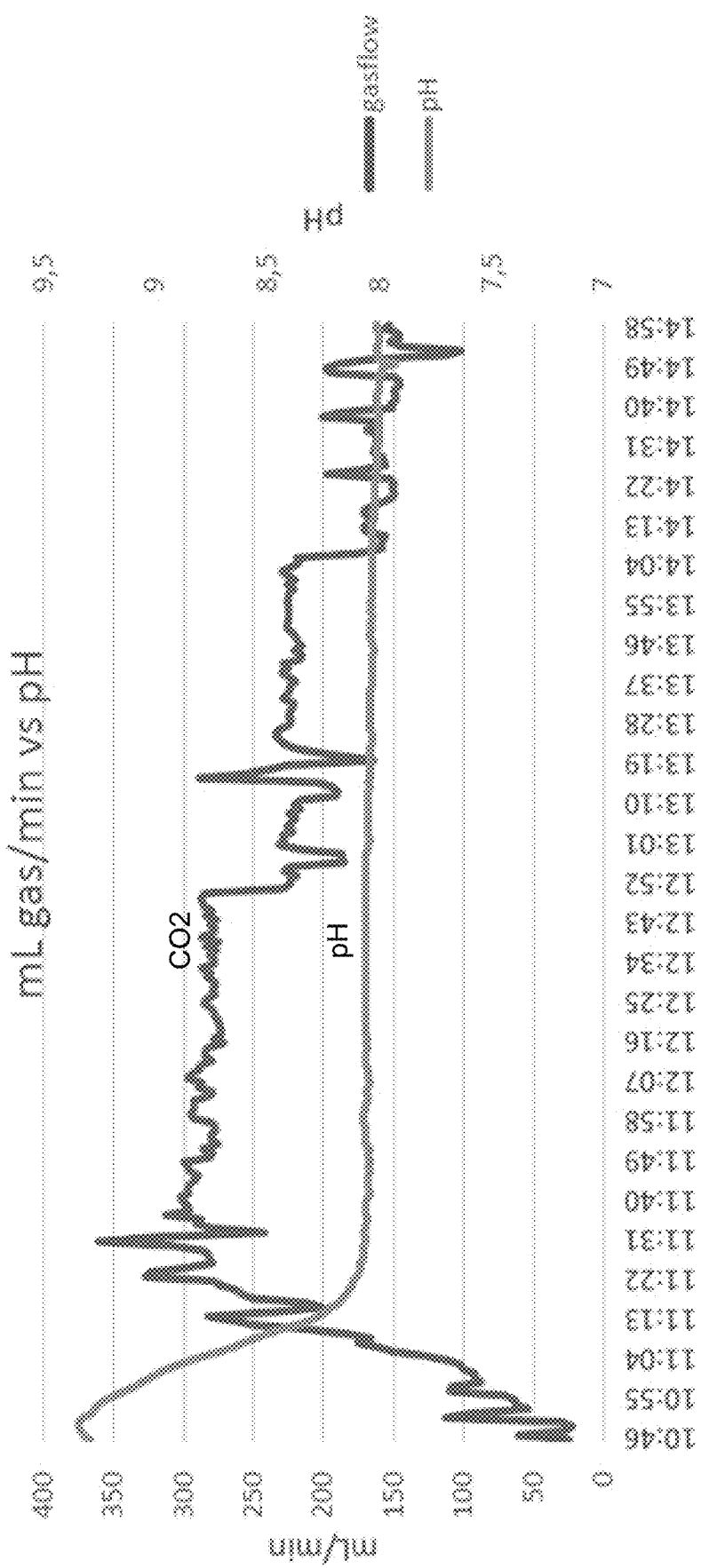
FIG. 5 shows test results of the overall generation of gas flow in the electrolytic cell and the pH-value over time.

FIG. 5 shows the overall gas generation in the electrolytic cell and the pH-value over time. As is shown, the gas flow on the anode side of the electrolytic cell is fairly low at the beginning of the trial. Here, the pH-value of the scrubbing liquid is around 9.5. As the pH-value drops, the gas flow increases until it reaches its maximum level at a pH of about 8.5. Thereafter, the gas flow stabilizes at about 290 ml gas/min and the pH-value at about 8.

Figure 6:
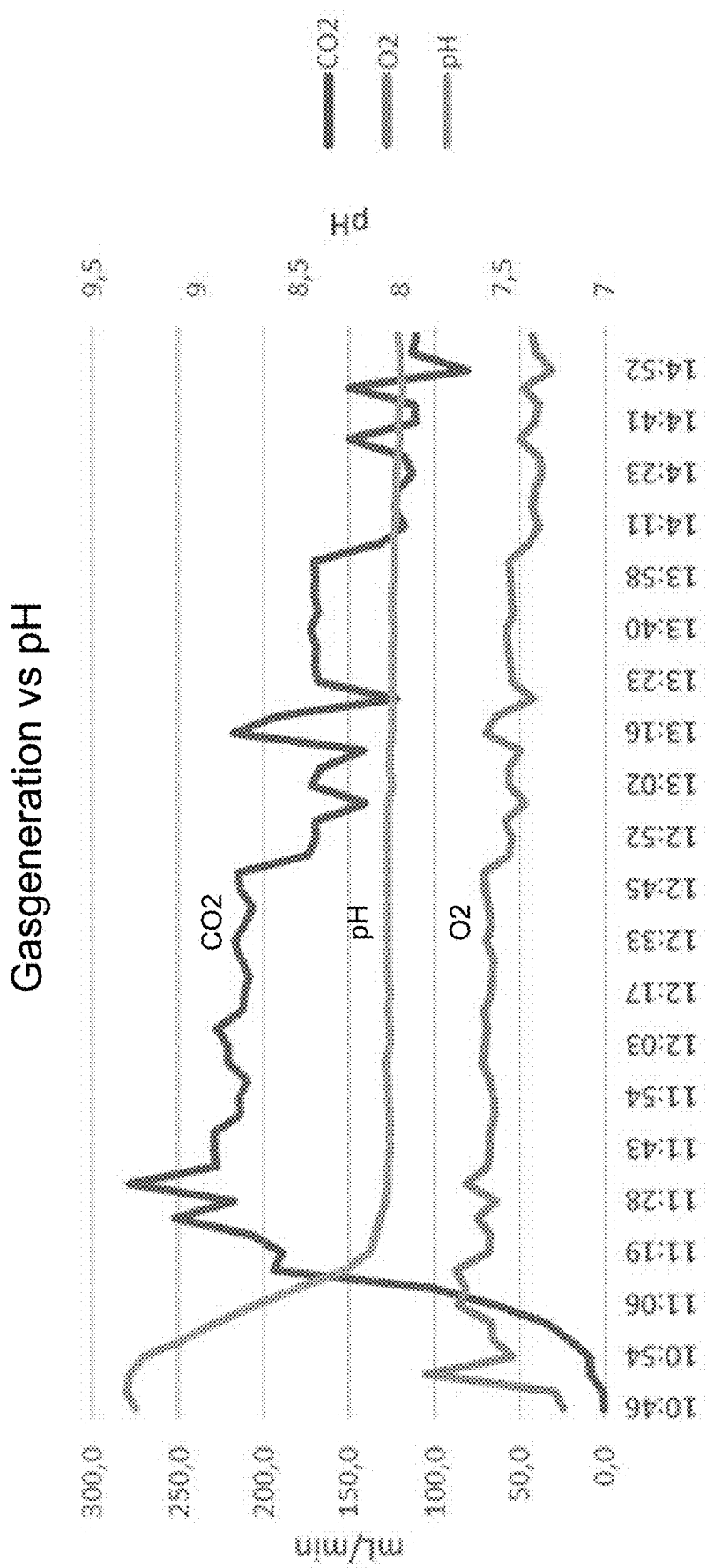
FIG. 6 shows test results of the gas flow of $CO_2$ and $O_2$ in relation to the pH-value over time.
Figure 7:
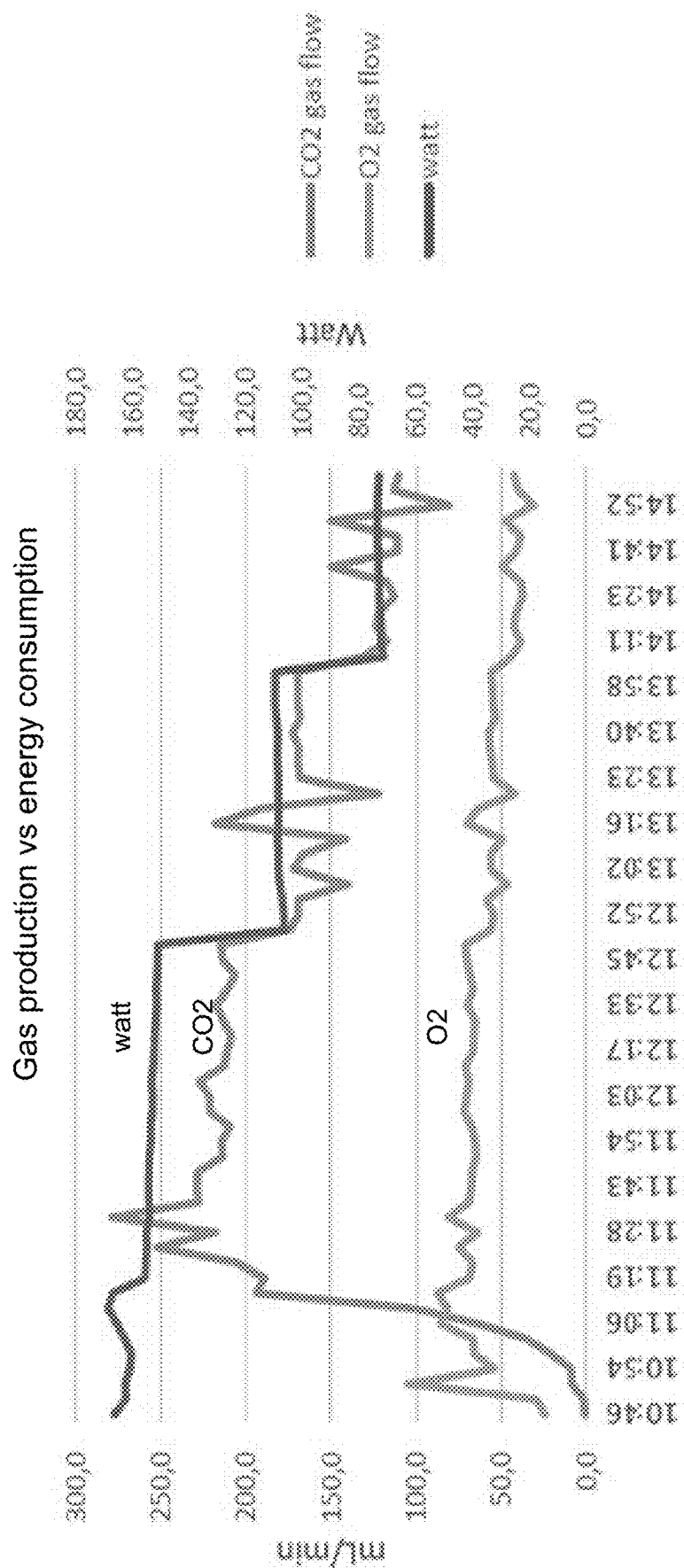
FIG. 7 shows test results of the gas production of $CO_2$ and $O_2$ in relation to the energy consumption over time.

In FIG. 6, the gas flow of $CO_2$ and $O_2$ is illustrated in relation to the pH-value over time. As can be seen, in the beginning, only $O_2$ is produced and there is no release of $CO_2$. However, as soon as the pH-value begins to drop, the process starts to produce $CO_2$ gas and the collective rise in gas flow is substantially due to the rise in $CO_2$. The gas then has the composition of approximately 25% $O_2$ and 75% $CO_2$. Thus, it is shown once again that the pH-value plays an important role in the gas composition and in the production of $CO_2$ from the scrubbing liquid and hence also in the regeneration of scrubbing fluid. Preferably, the process is operated to provide the spent aqueous scrubbing liquid with a pH-value of about 8.5. This is where an optimal gas production and generation of $CO_2$ occurs.

Hence, the scrubber 210 may be seen not only as a scrubber, but importantly also as a pH-regulator. The scrubber 210 is preferably divided into several steps or absorbers, such as the first and second absorbers 211, 212 depicted with dashed lines in FIG. 2. The scrubber fluid entering the second absorber 212 has a higher pH-value than the fluid exiting the first absorber 211 to the anode chamber 313 of the electrolytic cell 310. This is also clear from FIG. 7 where the gas production of $CO_2$ and $O_2$ is shown in relation to the energy consumption. Here, the current has been decreased in three steps, marked by the blue line which has a step-like shape.

Figure 8:
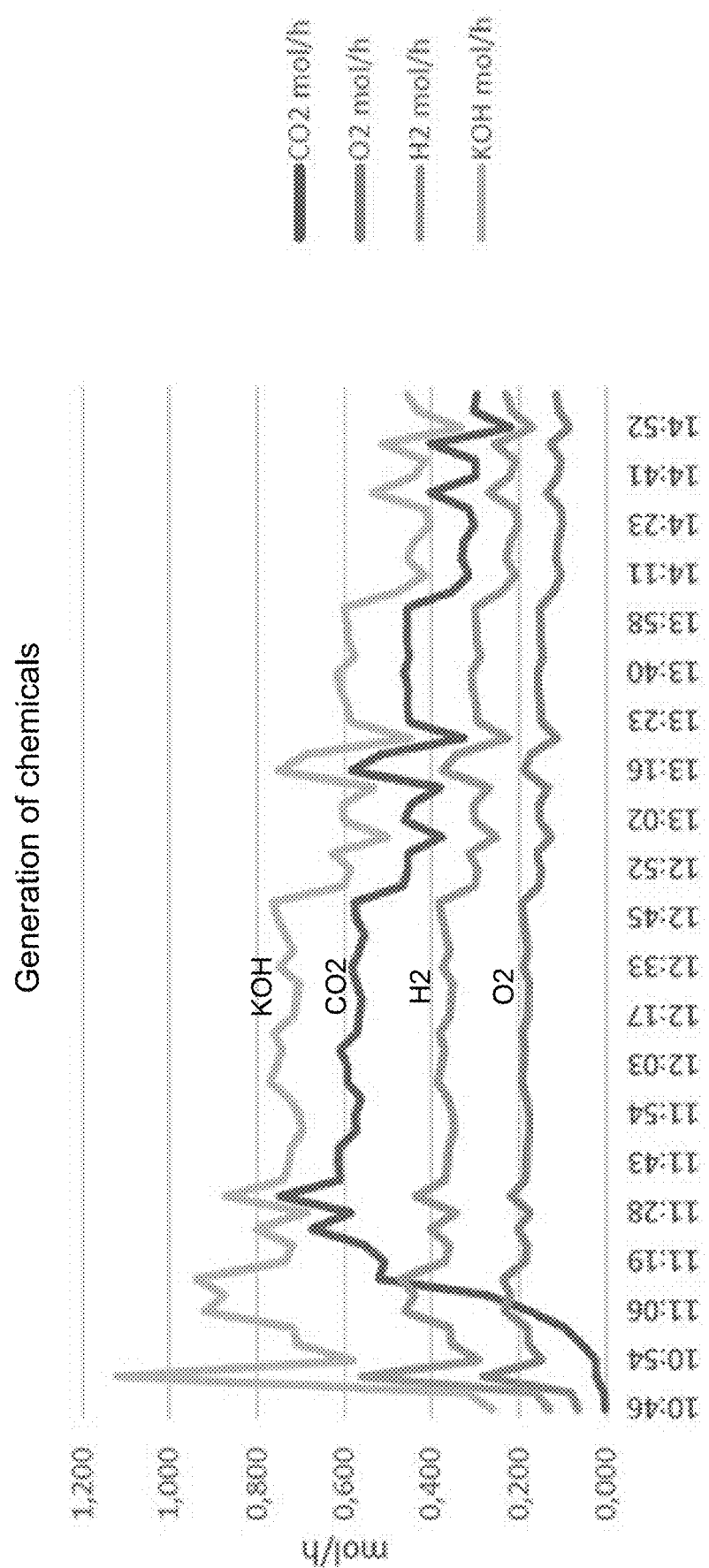
FIG. 8 shows test results of the relationship between the production of gases leaving the electrolytic cell over time.

FIG. 8 shows the relationship between the production of gases leaving the electrolytic cell per hour as measured over time. It is clear that the production of $O_2$, $H_2$ and KOH starts immediately, whereas the $CO_2$ production begins as the pH-value is decreased to an appropriate level as previously described. The production of $H_2$ follows the production of $O_2$ in a ratio of 2 parts $H_2$ per one part $O_2$. Moreover, the production of KOH follows the production of $H_2$ in a ratio of 2 parts KOH per part $H_2$.

From Table 4 it is clear that essentially no additional energy is required for generating $CO_2$ and producing KOH for the regeneration of the scrubbing fluid, when compared to conventional $H_2$ electrolysis. This way, the $H_2$ production actually can compensate substantially for the energy required for the $CO_2$ capture.

TABLE 4

Power consumption in the production of $CO_2$.

| | | |
|---|---|---|
| $CO_2$-production: | 0.59 mol/h | (aim in the trials) |
| Power consumption | 40 Watt | (aim and assumed from industrial standards) |
| Power consumption pr. mol: | 67.8 Watt/mol | calculated |
| Power consumption pr. ton $CO_2$: | 1541 kW | calculated |
| Total production of $H_2$ | 26.7 kg/ton $CO_2$ | calculated |
| Power consumption pr. kg $H_2$ | 57.5 kW | calculated |

In summary, the disclosure intends to describe a system 100 which reduces the cost (per ton of $CO_2$) for capturing $CO_2$ as compared to existing technologies, where the costs are associated with green electrical power, $CO_2$ quota or tax costs as well as hydrogen sales price.

The invention claimed is:

1. A method of scrubbing a gas comprising carbon dioxide to deplete the gas of the carbon dioxide ($CO_2$), the method comprising:
   scrubbing the gas in a scrubber with a first alkaline, aqueous scrubbing liquid to dissolve carbon dioxide ($CO_2$) as hydrogen carbonate ($HCO_3^-$) and/or as carbonate ($CO_3^{2-}$) in the first alkaline, aqueous scrubbing liquid, thereby providing a first spent aqueous scrubbing liquid comprising hydrogen carbonate ($HCO_3^-$) and/or carbonate ($CO_3^{2-}$),
   the first spent aqueous scrubbing liquid having a pH from about 7 to about 9;
   feeding the first spent aqueous scrubbing liquid to an anode chamber of an electrolytic cell comprising the anode chamber and a cathode chamber separated by a membrane;
   regenerating the first spent aqueous scrubbing liquid in the electrolytic cell by electrolysis, the electrolysis increasing the pH of the first spent aqueous scrubbing liquid in the cathode chamber, the electrolysis further depleting the first spent aqueous scrubbing liquid of hydrogen carbonate ($HCO_3^-$) and of carbonate ($CO_3^{2-}$) in the anode chamber by decreasing the pH, the regeneration further comprising generating gaseous hydrogen in the cathode chamber and a gaseous mixture of oxygen and carbon dioxide ($CO_2$) in the anode chamber by electrolysis; and withdrawing regenerated alkaline, aqueous scrubbing liquid from the cathode chamber and re-circulating it to the scrubber;

wherein:

the scrubbing of the gas is performed in a first stage and in a second stage, the regenerated alkaline, aqueous scrubbing liquid withdrawn from the cathode chamber, being fed as a second alkaline, aqueous scrubbing liquid to the second stage of scrubbing downstream of the first stage of scrubbing, and wherein a second spent scrubbing liquid, resulting from the second stage of scrubbing, at least partly is fed as the first alkaline, aqueous scrubbing liquid to the first stage of scrubbing upstream of the second stage of scrubbing, the pH of the second alkaline, aqueous scrubbing liquid being higher than the pH of the first alkaline, aqueous scrubbing liquid, the gaseous hydrogen is withdrawn from the cathode chamber; and the gaseous mixture of oxygen and carbon dioxide is withdrawn from the anode chamber.

2. The method according to claim 1, wherein the method further comprises separating the gaseous mixture of oxygen and carbon dioxide into:

a first stream rich in oxygen and/or depleted of carbon dioxide; and a second stream rich in carbon dioxide and/or depleted of oxygen.

3. The method according to claim 1, wherein:

the regenerated alkaline, aqueous scrubbing liquid withdrawn from the cathode chamber is mixed with a part of the second spent scrubbing liquid to provide the second alkaline, aqueous scrubbing liquid, whereby the pH of the second alkaline, aqueous scrubbing liquid is lower than the pH of the regenerated alkaline, aqueous scrubbing liquid withdrawn from the cathode chamber; and/or part of the second spent scrubbing liquid is mixed with a part of a first spent scrubbing liquid, resulting from the first stage of scrubbing, to provide the first alkaline, aqueous scrubbing liquid, whereby the pH of the first alkaline, aqueous scrubbing liquid being higher than the pH the first spent scrubbing liquid.

4. The method according to claim 1, wherein carbon dioxide ($CO_2$) and/or oxygen ($O_2$) withdrawn from the anode chamber is compressed into liquid carbon dioxide and/or compressed oxygen ($O_2$).

5. The method according to claim 1, wherein the gas is flue gas or exhaust gas.

6. The method according to claim 1, wherein the carbon dioxide ($CO_2$) is dissolved as the hydrogen carbonate ($HCO_3^-$) and the carbonate ($CO_3^{2-}$) in the first alkaline, aqueous scrubbing liquid, thereby providing a first spent aqueous scrubbing liquid comprising the hydrogen carbonate ($HCO_3^-$) and the carbonate ($CO_3^{2-}$).

7. The method according to claim 1, wherein the pH of the second alkaline, aqueous scrubbing liquid is 12 to 14 and the pH of the first alkaline, aqueous scrubbing liquid is 8 to 10.

8. The method according to claim 1, wherein hydrogen withdrawn from the cathode chamber is used as a fuel to provide electricity.

9. The method according to claim 8 wherein the fuel is provided in a fuel cell.

10. The method according to claim 1, wherein the method further comprises:

withdrawing an aqueous stream still comprising some hydrogen carbonate ($HCO_3^-$) from the anode chamber;

concentrating the withdrawn aqueous stream comprising some hydrogen carbonate ($HCO_3^-$) to provide a concentrated stream comprising hydrogen carbonate ($HCO_3^-$); and re-circulating the concentrated stream comprising hydrogen carbonate ($HCO_3^-$) to the electrolytic cell.

11. The method according to claim 10, wherein the concentrating is achieved by reversed osmosis.

12. The method according to claim 1, wherein the first alkaline, aqueous scrubbing liquid comprises a dissolved metal hydroxide.

13. The method according to claim 12, wherein the dissolved metal hydroxide comprises one or more of dissolved potassium hydroxide (KOH), dissolved sodium hydroxide (NaOH), and dissolved lithium hydroxide (LiOH).

14. The method according to claim 12, wherein the first alkaline, aqueous scrubbing liquid comprises potassium hydroxide (KOH).

15. The method according to claim 1, wherein part of the regenerated alkaline, aqueous scrubbing liquid is re-circulated to the cathode chamber.

16. The method according to claim 15, wherein the regenerated alkaline, aqueous scrubbing liquid is diluted by an aqueous stream before re-circulating it to the cathode chamber.

17. The method according to claim 15, wherein said aqueous stream is provided by withdrawing an aqueous stream still comprising some hydrogen carbonate ($HCO_3^-$) from the anode chamber and concentrating it to provide an aqueous stream depleted of hydrogen carbonate ($HCO_3^-$) and a concentrated stream comprising hydrogen carbonate ($HCO_3^-$).

18. The method according to claim 17, where the concentrating is achieved by reversed osmosis.

19. A system for scrubbing a gas comprising carbon dioxide to deplete the gas of the carbon dioxide ($CO_2$), the system comprising:

a scrubber configured to scrub the gas with a first alkaline, aqueous scrubbing liquid to dissolve carbon dioxide ($CO_2$) as hydrogen carbonate ($HCO_3^-$) and/or as carbonate ($CO_3^{2-}$) in the first alkaline, aqueous scrubbing liquid, thereby providing a first spent aqueous scrubbing liquid comprising hydrogen carbonate ($HCO_3^-$) and/or carbonate ($CO_3^{2-}$), the first spent aqueous scrubbing liquid having a pH from about 7 to about 9;

an electrolytic cell comprising an anode chamber and a cathode chamber separated by a membrane, the anode chamber being configured to receive the first spent aqueous scrubbing liquid;

a regeneration arrangement configured to regenerate the first spent aqueous scrubbing liquid in the electrolytic cell by electrolysis, the electrolysis increasing the pH of the first spent aqueous scrubbing liquid in the cathode chamber, the electrolysis further depleting the first spent aqueous scrubbing liquid of hydrogen carbonate ($HCO_3^-$) and of carbonate ($CO_3^{2-}$) in the anode chamber by decreasing the pH, the regeneration further comprising generating gaseous hydrogen in the cathode chamber and a gaseous mixture of oxygen and carbon dioxide ($CO_2$) in the anode chamber by electrolysis; wherein, in use:

the scrubber is configured to perform scrubbing at least in a first stage and in a second stage, the regenerated alkaline, aqueous scrubbing liquid withdrawn from the cathode chamber, being fed as a second alkaline, aqueous scrubbing liquid to the second stage of scrubbing downstream of the first stage of scrubbing, and wherein a second spent scrubbing liquid, resulting from the second stage of scrubbing, at least partly is fed as the first alkaline, aqueous scrubbing liquid to the first stage of scrubbing upstream of the second stage of scrubbing, the pH of the second alkaline, aqueous scrubbing liquid being higher than the pH of the first alkaline, aqueous scrubbing liquid, the regenerated alkaline, aqueous scrubbing liquid is withdrawn from the cathode chamber and re-circulated to the scrubber;

the gaseous hydrogen is withdrawn from the cathode chamber; and the gaseous mixture of oxygen and carbon dioxide is withdrawn from the anode chamber.

20. The system according to claim 19, further comprising a separator to separate the gaseous mixture of oxygen and carbon dioxide into:

a first stream rich in oxygen and/or depleted of carbon dioxide; and a second stream rich in carbon dioxide and/or depleted of oxygen.

21. The system according to claim 19, wherein the system further comprises:

an aqueous stream still comprising some hydrogen carbonate ($HCO_3^-$) is withdrawn from the anode chamber; wherein:

the withdrawn aqueous stream comprising some hydrogen carbonate ($HCO_3^-$) is concentrated to provide a concentrated stream comprising hydrogen carbonate ($HCO_3^-$); and the concentrated stream comprising hydrogen carbonate ($HCO_3^-$) is re-circulated to the electrolytic cell.

22. The system according to claim 19, wherein the pH of the second alkaline, aqueous scrubbing liquid is 12 to 14 and the pH of the first alkaline, aqueous scrubbing liquid is 8 to 10.

23. The system according to claim 19, wherein the first alkaline, aqueous scrubbing liquid comprises a dissolved metal hydroxide.

24. The system according to claim 23, wherein the dissolved metal hydroxide comprises one or more of dissolved potassium hydroxide (KOH), dissolved sodium hydroxide (NaOH), and dissolved lithium hydroxide (LiOH).

25. The system according to claim 23, wherein the first alkaline, aqueous scrubbing liquid comprises potassium hydroxide (KOH).

26. The system according to claim 19, wherein part of the regenerated alkaline, aqueous scrubbing liquid is re-circulated to the cathode chamber.

27. The system according to claim 26, wherein the regenerated alkaline, aqueous scrubbing liquid is diluted by an aqueous stream before re-circulating it to the cathode chamber.

28. The system according to claim 26, wherein said aqueous stream is provided by withdrawing an aqueous stream still comprising some hydrogen carbonate ($HCO_3^-$) from the anode chamber and concentrating it to provide an aqueous stream depleted of hydrogen carbonate ($HCO_3^-$) and a concentrated stream comprising hydrogen carbonate ($HCO_3^-$).

* * * * *